(No Model.)

J. F. WEITZEL.
STOVE PIPE HEATING DRUM.

No. 244,011. Patented July 5, 1881.

Attest.
Walter Allen
L. M. Hopkins

Inventor.
Jacob F. Weitzel
By Knight Bros.
Attys.

UNITED STATES PATENT OFFICE.

JACOB F. WEITZEL, OF CINCINNATI, OHIO, ASSIGNOR TO LOUISA WEITZEL, OF SAME PLACE.

STOVE-PIPE HEATING-DRUM.

SPECIFICATION forming part of Letters Patent No. 244,011, dated July 5, 1881.

Application filed April 19, 1881. (No model.)

*To all whom it may concern:*

Be it known that I, JACOB F. WEITZEL, of Cincinnati, Hamilton county, Ohio, have invented a new and useful Improvement in Stove-Pipe Heating-Drums, of which the following is a specification.

My invention relates to an improvement in those stove-pipe heating-drums which possess an inverted conical deflector.

A leading object of my invention is to secure a deflection of heat to the walls and other heat-radiating surfaces of the drum without serious interference with the ascent of smoke. With this object in view I construct my inverted cone of wire-gauze of sufficient fineness of mesh to both forbid the passage through it of flame and to a considerable extent intercept the heat, and thus direct it toward the drum-walls without entirely preventing the direct ascent of smoke.

My improvement further comprises an arrangement of cone-connections which enables the agitation of that member for the purpose of dislodgment of soot, or which permits it to be wholly withdrawn to one side, so as to leave for the time being a clear and unobstructed passage for the smoke when extraordinary draft facilities are needed—as, for example, at the first kindling or at any subsequent charging of the fire.

Figure 1:
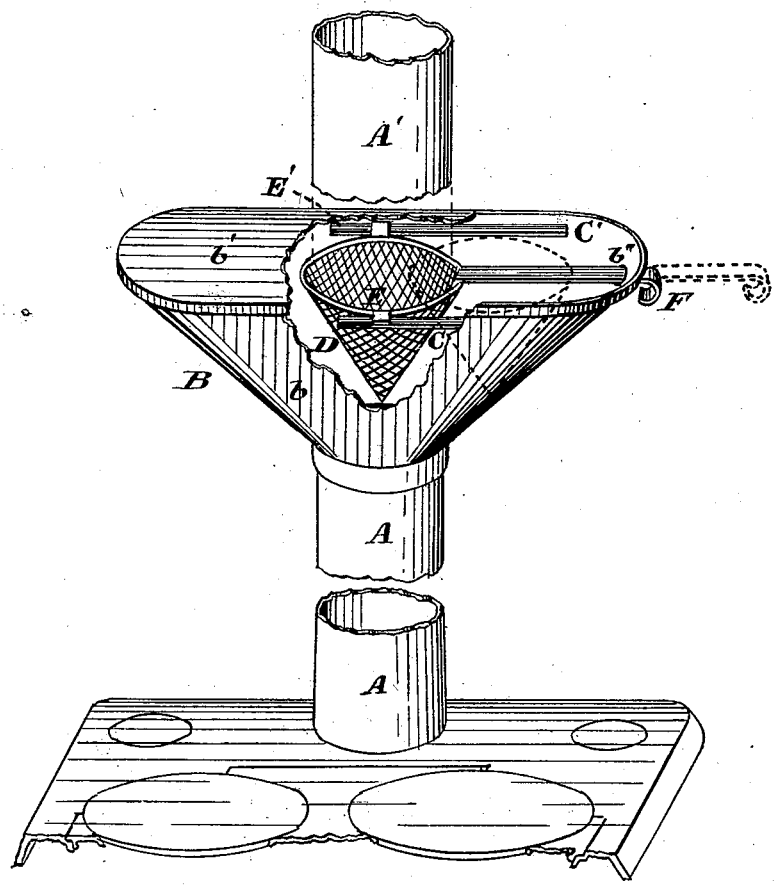
Figure 2:
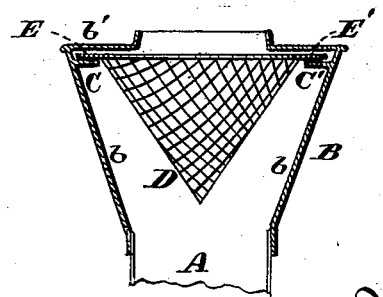

In the accompanying drawings, Figure 1 is a perspective view of a stove-pipe drum provided with my improved conical deflector, a portion of the drum-walls being broken away to expose the deflector. Fig. 2 is a transverse vertical section.

A A' may represent portions of a stove-pipe. B is a drum or enlargement of the pipe, formed by upwardly diverging or flaring walls $b$ and a flat top, $b'$, the latter being capable of utilization as a heating-shelf for cooking-vessels. The flare of said drum is preferably for the most part in one plane, so as to present an oblong transverse section.

Projecting interiorly from the drum-walls, near the upper edge thereof, are two ledges, C C', for the support of my deflector, and for its guidance to and from its effective position, (here shown by strong lines.)

D is my deflector, constructed of wire-gauze of sufficient closeness of mesh to wholly intercept any ascending flame and drive it outward, so as to impinge against the flaring drum-walls, and to thereby heat the same. The wire-gauze constituting my deflector proper is so bent and secured as to possess the form of an inverted cone having a stiffening rim or margin, from which project ears E E', that rest and slide upon the aforesaid ledges C C'.

Projecting horizontally from the deflector proper, D, is a stem or handle, F, which, extending through an orifice, $b''$, in the drum-wall, enables the cone to be drawn to the position indicated by dotted lines, in which it ceases for the time being to intercept the direct ascent of the smoke. The same construction also enables the deflector to be agitated by a brisk reciprocation of the handle, so as to dislodge soot therefrom, and thus to keep the meshes of the cone open.

The ledges C C' may, if preferred, be formed by projections from the cap-plate or shelf $b'$.

I claim as new and of my invention—

The combination, with a suitable stove-pipe drum or enlargement, B $b$ $b'$ $b''$, having the interior guiding-ledges C C', of the inverted conical wire-gauze deflector D, having the ears E E' and handle F, as and for the purposes set forth.

In testimony of which invention I hereunto set my hand.

JACOB F. WEITZEL.

Attest:
GEO. H. KNIGHT,
JOHN D. GALLAGHER.